United States Patent
Ahsaine

(10) Patent No.: US 11,447,364 B2
(45) Date of Patent: Sep. 20, 2022

(54) METHOD FOR DETERMINING AN ABSOLUTE POSITION OF A MOVING TRAVEL UNIT OF A STATIONARY TRANSPORT SYSTEM

(71) Applicant: TK Elevator Innovation and Operations GmbH, Duesseldorf (DE)

(72) Inventor: Said Ahsaine, Wolfach (DE)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 1028 days.

(21) Appl. No.: 16/074,892

(22) PCT Filed: Feb. 9, 2017

(86) PCT No.: PCT/EP2017/052857
§ 371 (c)(1),
(2) Date: Aug. 2, 2018

(87) PCT Pub. No.: WO2017/140570
PCT Pub. Date: Aug. 24, 2017

(65) Prior Publication Data
US 2019/0062104 A1 Feb. 28, 2019

(30) Foreign Application Priority Data

Feb. 16, 2016 (DE) ...................... 10 2016 202 364.0

(51) Int. Cl.
*B66B 1/34* (2006.01)
*H02P 25/064* (2016.01)
(Continued)

(52) U.S. Cl.
CPC ............ *B66B 1/3492* (2013.01); *B60L 13/06* (2013.01); *B60L 15/005* (2013.01);
(Continued)

(58) Field of Classification Search
CPC ... B66B 1/3492; B66B 11/0407; B66B 23/02; B66B 27/00; B66B 2201/30; B60L 13/06;
(Continued)

(56) References Cited

U.S. PATENT DOCUMENTS 5,288,956 A 2/1994 Kadokura
5,625,174 A * 4/1997 Ito ..................... B66B 11/0055
187/289

(Continued)

FOREIGN PATENT DOCUMENTS

CN 102001340 A 4/2011
DE 4101776 A 9/1991
(Continued)

OTHER PUBLICATIONS

English Translation of International Search Report issued in PCT/EP2017/052857, dated May 29, 2017 (dated Jun. 27, 2017).
(Continued)

*Primary Examiner* — Jeffrey Donels
(74) *Attorney, Agent, or Firm* — William J. Cassin

(57) ABSTRACT

Methods for determining an absolute position of a moving travel unit of a stationary transport system, the travel unit movable along a travel path inside the system. The travel unit is driven by at least one linear motor along the path. The linear motor is a synchronous motor including a plurality of stator units installed along the travel path configured to provide a magnetic field traveling along the travel path. At least one rotor unit is attached to the travel unit and is configured to be driven along the travel path by the traveling magnetic field. Wherein respectively by analysis of regulating parameters of a vector regulation of the linear motor an active stator unit is determined from the plurality, which presently provides the magnetic field driving the rotor unit
(Continued)

and a relative position of the rotor unit in relation to the active stator unit is computed.

11 Claims, 3 Drawing Sheets

(51) Int. Cl.
| | | |
|---|---|---|
| *B66B 11/04* | (2006.01) | |
| *G01B 7/00* | (2006.01) | |
| *B60L 15/00* | (2006.01) | |
| *H02P 21/18* | (2016.01) | |
| *B60L 13/06* | (2006.01) | |
| *G01D 5/14* | (2006.01) | |
| *H02K 41/03* | (2006.01) | |
| *B66B 23/02* | (2006.01) | |
| *B66B 27/00* | (2006.01) | |

(52) U.S. Cl.
CPC .......... *B66B 11/0407* (2013.01); *G01B 7/003* (2013.01); *G01D 5/14* (2013.01); *H02K 41/03* (2013.01); *H02P 21/18* (2016.02); *H02P 25/064* (2016.02); *B66B 23/02* (2013.01); *B66B 27/00* (2013.01); *B66B 2201/30* (2013.01); *Y02T 10/64* (2013.01); *Y02T 10/72* (2013.01)

(58) Field of Classification Search
CPC ......... B60L 15/005; G01B 7/003; G01D 5/14; H02K 41/03; H02P 21/18; H02P 25/064; H02P 25/06; Y02T 10/64; Y02T 10/72
See application file for complete search history.

(56) References Cited

U.S. PATENT DOCUMENTS

| | | | | |
|---|---|---|---|---|
| 9,837,860 | B2* | 12/2017 | McCarthy | ............... H02J 50/40 |
| 2011/0050007 | A1 | 3/2011 | Kubo | |
| 2011/0221570 | A1 | 9/2011 | Finkler | |
| 2017/0355555 | A1* | 12/2017 | Ginsberg | .............. B66B 1/3492 |
| 2018/0105396 | A1* | 4/2018 | Purosto | ................... B66B 13/00 |
| 2018/0248498 | A1* | 8/2018 | Piitulainen | ........... H02K 41/033 |

FOREIGN PATENT DOCUMENTS

| | | |
|---|---|---|
| DE | 19718840 C | 10/1998 |
| DE | 102014104458 A | 10/2015 |
| EP | 0858965 A | 8/1998 |
| JP | H 09272677 A | 10/1997 |
| JP | 2010263681 A | 11/2010 |

OTHER PUBLICATIONS

AN93637 PSoC 4 Sensorless Field-Oriented Control (FOC), Bob Hu, Cypress Semiconductor Corp., Aug. 26, 2015 http://www.cypress.com/documentation/application-notes/an93637-psoc-4-sensorless-field-oriented-control-foc.

Gurbuz et al. "Linear motor for multi—car elevators: design and position measurement", Turk J Elec Eng & Comp Sci, vol. 19, No. 6, (2011).

* cited by examiner

METHOD FOR DETERMINING AN ABSOLUTE POSITION OF A MOVING TRAVEL UNIT OF A STATIONARY TRANSPORT SYSTEM

CROSS REFERENCE TO RELATED APPLICATIONS

This application is a U.S. National Stage Entry of International Patent Application Serial Number PCT/EP2017/052857, filed Feb. 9, 2017, which claims priority to German Patent Application No. DE 10 2016 202 364.0, filed Feb. 16, 2016, the entire contents of both of which are incorporated herein by reference.

FIELD

The present disclosure generally relates to a method for determining an absolute position of a moving travel unit of a stationary transport system.

BACKGROUND

Sensor-based methods have heretofore generally been used to determine the position of a car in an elevator shaft. For this purpose, for example, an RFID sensor is attached to the car, which detects RFID tags permanently installed in the elevator shaft as it travels past, whereby the position of the sensor can be determined. To enable an exact position determination via RFID, a high density of RFID sensors is required.

In particular in those transport systems in which multiple travel units use a common travel path jointly but independently of one another, redundant position determination systems are to be provided. Since the sensor-based systems are usually quite costly to install, it is desirable to provide the most cost-effective position determination system possible, which can be used alternatively to or in combination with other position determination systems or safety systems. Thus a need exists for providing a cost-effective position determination system.

DETAILED DESCRIPTION

Figure 1:
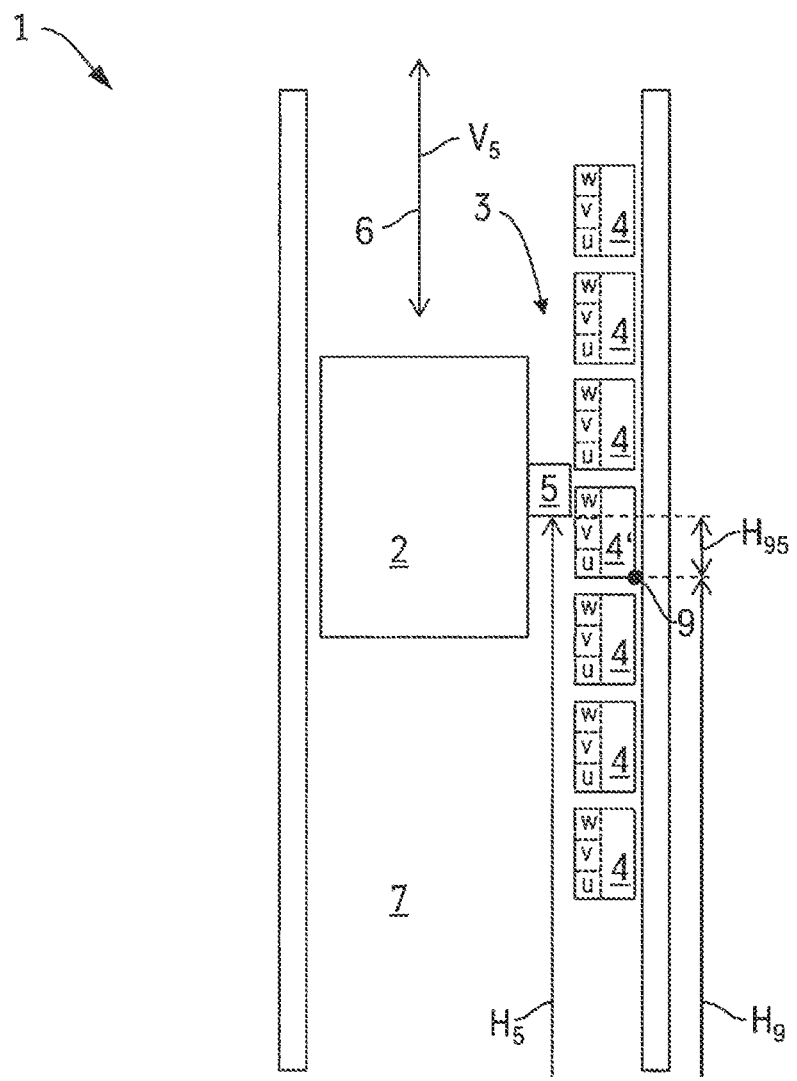
FIG. 1 is a representation of an elevator system comprising a linear drive, in which the method is used.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method for determining an absolute position of a moving travel unit of a stationary transport system. The term "stationary transport system" includes elevator systems, escalators, or moving walkways, which are installed in particular in buildings or ships.

A method is provided according to the invention for determining an absolute position of a moving travel unit of a stationary transport system, the travel unit being movable along a travel path inside the transport system. The travel unit is driven by means of at least one linear motor along the travel path, in this case the linear motor is embodied as a synchronous motor. The linear motor comprises, on the one hand, a plurality of stator units, which are installed along the travel path and are configured to provide a magnetic field which travels along the travel path. On the other hand, the linear motor comprises at least one rotor unit, which is attached to the travel unit and which is configured to be driven along the travel path by the traveling magnetic field. By analysis of regulating parameters of a vector regulation of the linear motor, on the one hand, an active stator unit is determined from the plurality of stator units which provides the magnetic field which presently drives the rotor unit. On the other hand, by analysis of the regulating parameters, a relative position of the rotor unit in relation to this active stator unit is computed.

The absolute position of the rotor unit and therefore also the travel unit may then be determined from these two findings. This determined absolute position can be used for further control and regulating tasks of the transport system, in particular for the speed regulation of the travel unit or collision monitoring. The collision monitoring is significant in transport systems having multiple travel units, which move independently of one another on a common travel path.

The respective associated absolute position is preferably stored for a plurality of stator units, in particular for all stator units, in a database. This absolute position is queried from the database for the determination of the absolute position of the travel unit.

The method according to the invention can be used solely to determine the present position of the travel unit; however, this method can also be carried out in combination with further methods independent of one another for determining the position of the travel unit, and thus form a means for providing redundancy. Furthermore, a collision monitoring method independent thereof can be executed in parallel to enhance the safety. In every application, a significant advantage of the method according to the invention is that already provided sensors and computer units can be used to carry out the additional task of position determination solely by expanding the functional scope thereof. The costly installation of further sensors and control units is not required. The application is particularly advantageous in conjunction with a position-sensorless vector regulation of the linear drive, since in this case a use of explicit position sensors, which would be installed in a large number along the travel path, can be omitted.

In one advantageous embodiment, a further rotor unit is attached to the travel unit; respectively, by analysis of variables of a vector regulation of the linear motor, on the one hand, a further active stator unit is determined from the plurality of stator units, which presently provides the magnetic field driving the further rotor unit and, on the other hand, a relative position of the further rotor unit in relation to the further active stator unit is computed. The method according to the invention is carried out in this case in parallel at a second rotor unit which is attached to the same travel unit. A redundant position determination already results in this way, which can manage without the use of additional position sensors. The further rotor unit is part of a further linear drive, with which either the same stator units of the above-mentioned linear drive are associated or which comprises further stator units separate therefrom.

Since the rotor unit is fixedly connected to the travel unit at least in the direction of the travel path, the position of the rotor unit is to be understood as synonymous with the position of the travel unit. Since the reference point is identified as a location fixedly connected to the stator unit, the position of the stator unit is to be understood as synonymous with the reference position.

The present invention is usable in particular for transport systems which comprise a plurality of travel units, which are movable independently of one another along a common travel path.

The above-described method enables in particular an accurate position determination of any one of the travel units, without it necessarily being determined which travel unit it is. It is thus primarily in particular a type of masterless, absolute position specification. In a following preferred refinement, it is possible that the absolute position of an individual travel unit, i.e., a specific travel unit is determined. The absolute position of an individual travel unit can only thus be determined.

For this purpose, a plurality of present absolute (masterless) positions are preferably determined, which are initially not associated with any of the travel units from the plurality of travel units. On the basis of an identification assembly, a plurality of present identified rough positions, at which travel units are located, are determined. Based on a comparison of the determined identified rough positions and the determined absolute (masterless) positions, one of the determined absolute positions is associated with an individual travel unit.

With the term plurality of present identified rough positions, it is to be taken into consideration that the presence of a travel unit is signaled simultaneously in each case by different sensors and thus a plurality of identified rough positions exists. At the same time, a plurality of absolute positions exists, which can be determined by the control circuit, but are not associated with a travel unit. A determined identified rough position can now be associated with each absolute position, whereby the association with an individual travel unit results.

The identification assembly can be implemented by an RFID system comprising a plurality of RFID tags, which are attached to the car, and RFID sensors, which are attached fixedly on the travel path, and with each of which a rough position is associated. However, other systems are also conceivable, which carry out in particular a unidirectional information exchange individually by travel unit between a unit attached to the travel path and a unit attached to the car. QR codes are also a simple example, which are attached to the travel path or to the travel unit, and a QR code reader, which is attached to the travel unit or to the travel path, respectively, and can read the QR code.

The accuracy of the determined absolute position is preferably more than 10 times the accuracy of the individual rough position, preferably more than 100 times, furthermore at least 1000 times. An increased accuracy by 1000 times means, for example: the absolute position may be delimited with millimeter accuracy on the basis of the regulating parameters; however, the identified rough position may only be delimited with meter accuracy on the basis of the identification assembly.

An elevator system 1 according to the invention is shown in FIG. 1. A car 2 is movably accommodated as a travel unit in an immobile elevator shaft 7. A rail system (not shown) defines a travel path 6, linear in this case, along which the car 2 is movable. The car 2 is driven in the direction of the travel path 6 by a linear motor 3, which is designed as a synchronous motor. The linear motor 3 comprises a plurality of stator units 4, which are fixedly installed along the travel path 6. Furthermore, the linear motor 3 comprises a rotor 5, which is fastened on the car 2 and moves jointly with the car 2 along the travel path 6.

To drive the rotor 5 and thus the car 2 by way of the linear motor 3, the stator units 4 of the linear motor 3 are to be regulated in a complex manner. Each stator unit 4 thus comprises a plurality of poles, in the present case three poles each, u, v, w. In the state of the elevator system shown in FIG. 1, the stator unit 4' is the stator unit which impinges the rotor 5 vertically upward by generating a magnetic field at the pole w and thus drives the car 2. The presently driving stator unit is referred to in the scope of the present application as the "active stator unit 4". If the rotor 5 subsequently enters the influence region of the pole u of the stator unit 4 located above this (this is the third stator unit 4 seen from the top in FIG. 1) during the further upward movement, this stator unit thus becomes the active stator unit, while the stator unit 4' active up to that point loses its status as the active stator unit as soon as the rotor 5 leaves the influence region of all poles u, v, w of this stator unit.

The regulation of the current supply to the windings of the poles of the stator units 4 is carried out via a vector regulation. The accurate knowledge of the relative position of the rotor 5 in relation to the stator units 4 is significant in this case. In this case, this relative position can be determined by separate position sensor means, which in particular comprise route markings attached along the travel path. According to the invention, sensorless regulating algorithms are preferably used, in which the relative positions may be derived from regulating parameters within the control circuit of the vector regulation. In this sensorless regulation, the circumstance is utilized that the rotor induces a current flow in the respective winding as a function of its relative position and relative speed in relation to the respective windings of the stator unit. This induced current flow may be determined by analyzing the stator currents. Reference is made to "AN93637 PSoC 4 Sensorless Field-Oriented Control (FOC)", Bob Hu, Cypress Semiconductor Corp., 26.08.2015, for the details of a sensorless vector regulation, retrievable under http://www.cypress.com/documentation/application-notes/an93637-psoc-4-sensorless-field-oriented-control-foc; explained therein on the basis of a rotating synchronous motor, which is similarly applicable to a linear motor.

Figure 2:
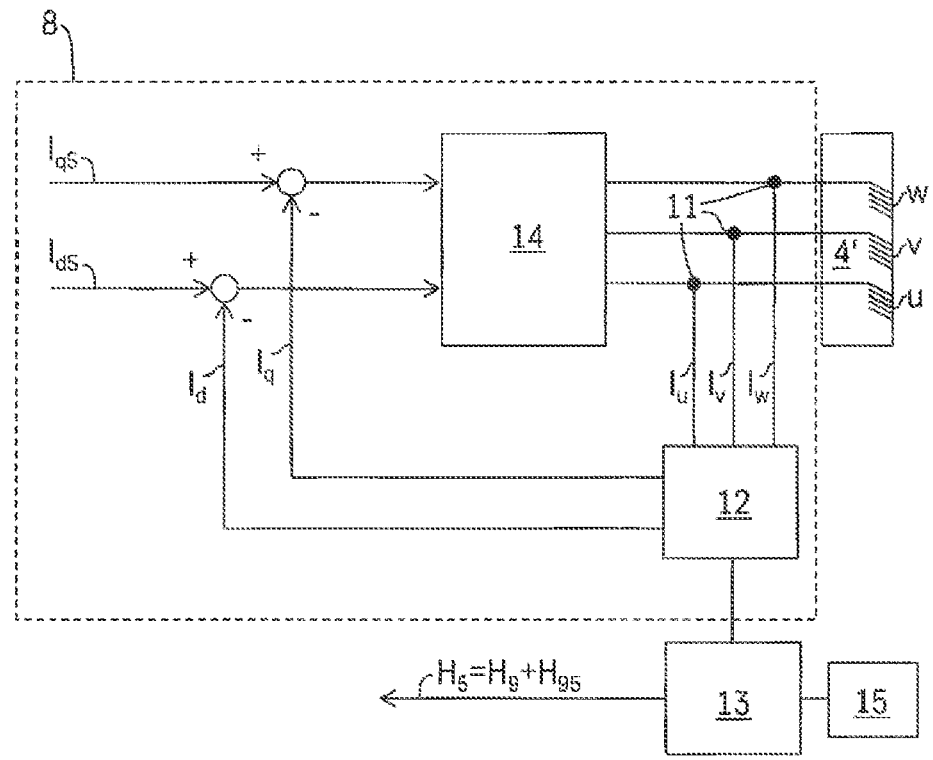
FIG. 2 is a schematic view of a current control circuit of the elevator system according to FIG. 1 for vector regulation of the linear synchronous motor.

FIG. 2 shows the control circuit 8 of such a vector regulation in simplified form. The stator currents $I_u$, $I_v$, $I_w$ of the windings u, v, w are determined via current sensors 11 and supplied to a Clark-Park transformer 12. This Clark-Park transformer 12 firstly converts the stator currents into a two-axis rotating system having the transformed actual current values $I_d$ and $I_q$. The relative alignment $H_{95}$ in relation to the windings u, v, w of the active stator unit 4' and thus in relation to a reference point 9 (FIG. 1) of the active stator unit 4' may be computed from values of this transformation via mathematical models, which can also be determined experimentally, in a slide mode observer 13. Moreover, it is known by observation of the control circuit which of the stator units is the active stator unit 4'.

If the active stator unit 4' is known, a reference position $H_9$ for its reference point 9 can thus be retrieved from a database 15, in which the reference positions for a plurality of stator units 4 are stored. The determined reference position $H_9$ represents the absolute position of this reference point 9 along the travel path 6. Since the car 2 is movable only in one direction dimension along the travel path 6, a one-dimensional variable is fundamentally sufficient as a unique position specification. The travel path can in principle also have a nonlinear course.

In the further course of the regulation, the transformed actual current values $I_d$ and $I_q$ are compared to corresponding setpoint values $I_{dS}$ and $I_{qS}$. The regulating difference generated therefrom is supplied to a regulator 14 having inverse Clark transformer and motor driver, which generates the stator currents $I_u$, $I_v$, $I_w$ there from and supplies them to the windings u, v, w of the active stator unit 4'.

The absolute position $H_5$ of the rotor 5 thus determined is now used for the travel regulation of an elevator, which will be explained on the basis of FIG. 3. Moreover, the present speed or the speed curve may be derived from the absolute position $H_5$. An elevator controller 10 specifies a setpoint position $H_{5S}$ or a setpoint speed $V_{5S}$; a regulating difference is determined in comparison to the present position $H_5$ or speed $V_5$, respectively. The car is to be decelerated or accelerated depending on the regulating difference, which is effectuated by a corresponding specification of the current setpoint values in the control circuit 8. A conversion unit required for this purpose for converting the regulating difference into the current setpoint values is not shown in FIG. 3 for reasons of comprehensibility.

The method according to the invention for position determination of the car therefore manages without the use of additional position sensors. This method can thus be used alone; however, it can also be used as a cost-effective redundancy method for other, in particular sensor-based position determination methods.

Figure 4:
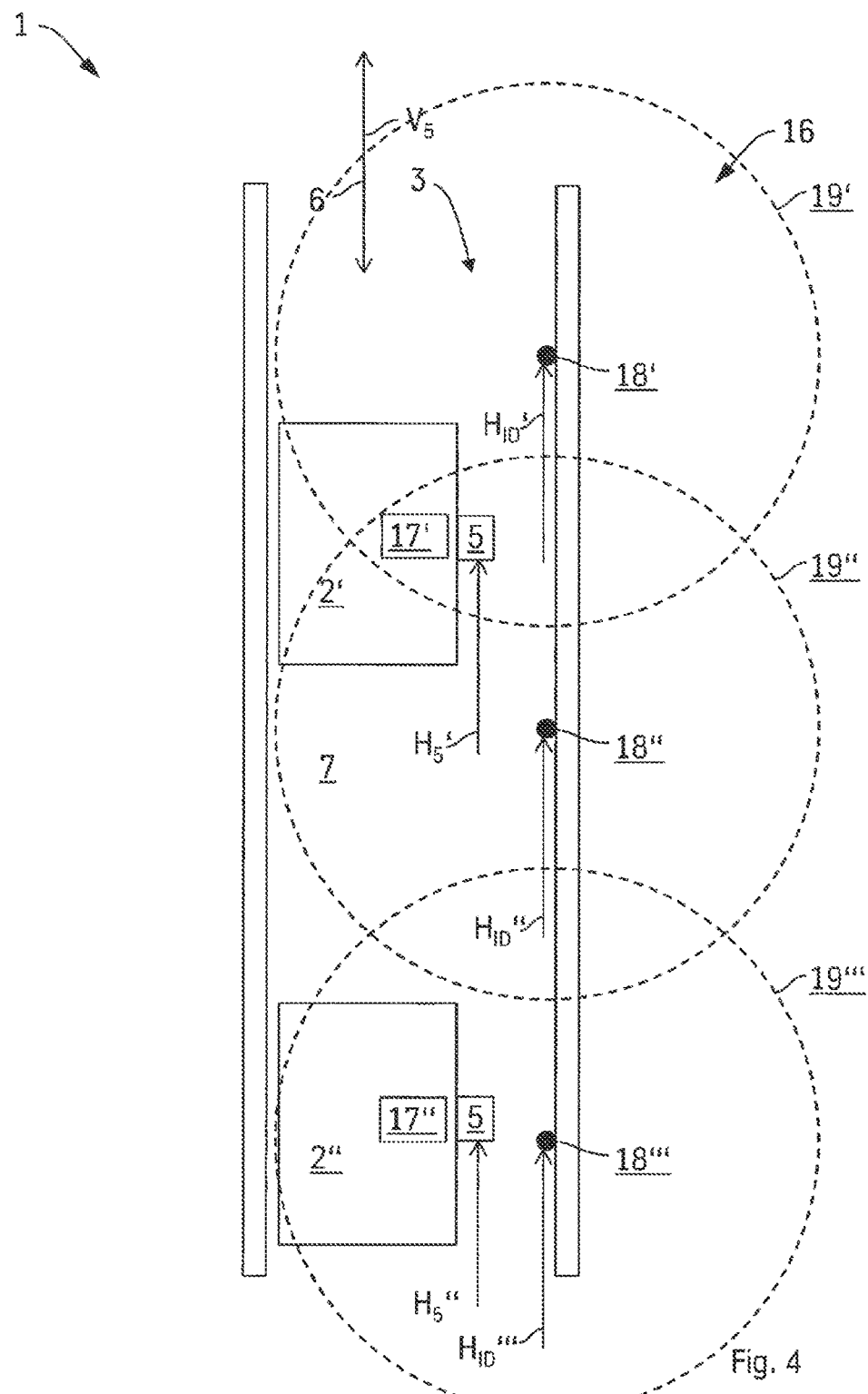
FIG. 4 is a representation of an elevator system comprising multiple travel units in an elevator shaft, in which the method is used.

The use of the method according to the invention in a so-called multi-elevator system will be explained on the basis of FIG. 4. In such systems, a plurality of cars 2 is located in a common elevator shaft 7. A first and a second car 2', 2" are shown in FIG. 4. In addition to the knowledge that an (any) undefined car 2 is located at a specific position $H_5$ in the elevator shaft 7, it is otherwise unimportant in this case which car this is. This is because the different cars finally have different travel tasks to fulfill, which are also accompanied by different speed profiles, and are therefore to be accelerated and decelerated differently. To determine which of the cars is located in the region of the active stator unit, an identification assembly 16 is provided, on the basis of which an identified rough position $H_{ID}$ of the cars 2 is determined. The identified rough position $H_{ID}$ is understood essentially as the knowledge about the approximate position of a uniquely identifiable, thus individual car in the elevator shaft 7.

The identification assembly 16 comprises a plurality of in particular passive RFID tags 17, at least one of which is attached to a car 2. Furthermore, the identification assembly 16 comprises a plurality of RFID sensors 18, which are arranged along the elevator shaft 7, and with each of which a rough position is associated. If the car 2" comprising its RFID tag 17" then enters the range region 18" of the RFID sensor 18", a rough position $H_{ID}'''$ is thus assigned to the car 2".

The other car 2' is located with its RFID tag 17' arranged in the range region 19' and 19" of the other RFID sensors 18' and 18". One of the rough positions $H_{ID}'$ or $H_{ID}''$, alternatively both rough positions $H_{ID}'$ and $H_{ID}''$, can thus be assigned to the car 2'. In this case, it is apparent from the signals of the RFID sensors 18' and 18" that the car 2' is located with its RFID tag 17' in the region between the two RFID sensors. The rough position can therefore also be refined further, for example, by averaging of the two assigned rough positions ($H_{ID,refined}=0.5 \times H_{ID}'+0.5 \times H_{ID}''$).

Figure 3:
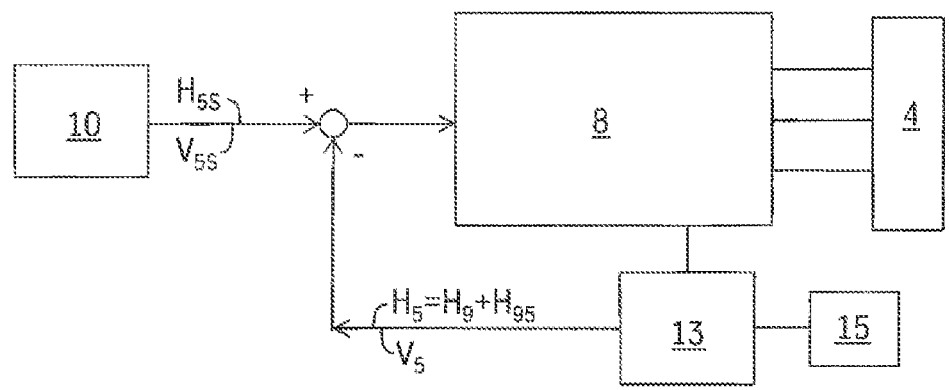
FIG. 3 is a schematic view of a superordinate control circuit of the elevator system according to FIG. 1 for travel regulation of the elevator.

It can already be established by the method which was explained on the basis of FIGS. 1 to 3 that any one of the cars is located in the exact absolute position $H_5'$, while any one of the other cars is located in the exact absolute position $H_5''$.

By similarity comparison of the determined identified rough positions $H_{ID}$ to the two absolute positions $H_5$, precisely one of the determined, initially still "masterless" absolute positions $H_5''$ is associated with the individual car 2"; the other absolute position $H_5'$ is associated with the individual car 2'.

Only a small number of RFID sensors, which are arranged over quite a long interval along the travel path, are required for the determination of the exact position of a car and association of this position with an individual car. The regulating parameters can be used for the computation of the exact position; no noteworthy additional sensors are required which are not already present in any case for the motor regulation.

What is claimed is:

1. A method for determining an absolute position of a moving travel unit of a stationary transport system, the travel unit being driven by at least one linear synchronous motor along a travel path inside the transport system, the linear motor including:
   a plurality of stator units installed along the travel path and configured to provide a magnetic field traveling along the travel path, and
   at least one rotor unit attached to the travel unit and configured to be driven along the travel path by the traveling magnetic field,
   the method comprising:
   storing in a database an absolute position of at least some of the plurality of stator units disposed along the travel path inside the transport system;
   analyzing regulating parameters of a vector regulation of the linear motor to:
   determine which of the plurality of stator units is active and providing the magnetic field that is driving the rotor unit, and
   compute a relative position of the rotor unit in relation to the active stator unit;
   querying from the database an absolute position of the active stator unit;
   calculating the absolute position of the travel unit by adding the absolute position of the active stator unit to the computed relative position of the rotor unit.

2. The method of claim 1, wherein the transport system further includes a second linear drive having stator units and a second rotor unit attached to the travel unit, the method further providing:
   analyzing variables of a vector regulation of the linear motor of the plurality of stator units to, determine a second active stator unit that is providing the magnetic field to drive the second rotor unit, and compute a relative position of the second rotor unit in relation to the second active stator unit.

3. The method of claim 1, wherein the transport system comprises a plurality of travel units, which are movable independently of one another along a common travel path.

4. The method of claim 3, further comprising:

determining a plurality of present absolute positions that are initially not associated with any of the travel units from the plurality of the travel units;

determining, on the basis of an identification assembly, a plurality of present identified rough positions at which travel units are located; and associating one of the determined absolute positions with an individual travel unit, based on a comparison of the determined identified rough positions and the determined absolute position.

5. The method of claim 1, wherein the vector regulation is a position-sensorless vector regulation.

6. A method for determining an absolute position of a moving travel unit of a stationary transport system, the travel unit being driven by at least one linear synchronous motor along a travel path inside the transport system, the linear motor including:

a plurality of stator units installed along the travel path and configured to provide a magnetic field traveling along the travel path, and at least one rotor unit attached to the travel unit and configured to be driven along the travel path by the traveling magnetic field, the method comprising:

analyzing regulating parameters of a position-sensorless vector regulation of the linear motor to:

determine which of the plurality of stator units is active and provides the magnetic field driving the rotor unit, and compute a relative position of the rotor unit in relation to the active stator unit.

7. The method of claim 6, further comprising the step of:

calculating the absolute position of the travel unit by adding an absolute position of the active stator unit to the computed relative position of the rotor unit.

8. The method of claim 7, further comprising the steps of:

storing in a database an absolute position of at least some of the plurality of stator units disposed along the travel path inside the transport system; and querying from the database an absolute position of the active stator unit.

9. The method of claim 6, wherein the transport system further includes a second linear drive having stator units and a second rotor unit attached to the travel unit, the method further comprising:

analyzing variables of a vector regulation of the linear motor of the plurality of stator units to, determine a second active stator unit that is providing the magnetic field to drive the second rotor unit, and compute a relative position of the second rotor unit in relation to the second active stator unit.

10. The method of claim 6, wherein the transport system comprises a plurality of travel units, which are movable independently of one another along a common travel path.

11. The method of claim 10, further comprising:

determining a plurality of present absolute positions that are initially not associated with any of the travel units from the plurality of the travel units;

determining, on the basis of an identification assembly, a plurality of present identified rough positions at which travel units are located; and associating one of the determined absolute positions with an individual travel unit, based on a comparison of the determined identified rough positions and the determined absolute position.

* * * * *